(12) United States Patent
Dubeuf et al.

(10) Patent No.: US 11,349,635 B2
(45) Date of Patent: May 31, 2022

(54) FAULT ATTACK RESISTANT CRYPTOGRAPHIC SYSTEMS AND METHODS

(71) Applicant: Maxim Integrated Products, Inc., San Jose, CA (US)

(72) Inventors: Jeremy Dubeuf, La Ciotat (FR); Yann Yves Rene Loisel, La Ciotat (FR); Frank Lhermet, Roquevaire (FR)

(73) Assignee: Maxim Integrated Products, Inc., San Jose, CA (US)

( * ) Notice: Subject to any disclaimer, the term of this patent is extended or adjusted under 35 U.S.C. 154(b) by 117 days.

(21) Appl. No.: 16/596,590

(22) Filed: Oct. 8, 2019

(65) Prior Publication Data

US 2020/0112425 A1    Apr. 9, 2020

(30) Foreign Application Priority Data

Oct. 9, 2018    (FR) ....................................... 1859337

(51) Int. Cl.
*H04L 9/00* (2022.01)
*H04L 9/08* (2006.01)
*G06F 7/58* (2006.01)

(52) U.S. Cl.
CPC ............ *H04L 9/004* (2013.01); *H04L 9/0869* (2013.01); *G06F 7/588* (2013.01); *H04L 2209/08* (2013.01); *H04L 2209/12* (2013.01)

(58) Field of Classification Search
CPC ..... H04L 9/004; H04L 9/0861; H04L 9/0869; H04L 2209/08; H04L 2209/12; G06F 21/556; G06F 7/588
See application file for complete search history.

(56) References Cited

U.S. PATENT DOCUMENTS

| | | | | |
|---|---|---|---|---|
| 2005/0021990 | A1* | 1/2005 | Liardet | H04L 9/004 713/194 |
| 2009/0097637 | A1* | 4/2009 | Boscher | H04L 9/3066 380/28 |
| 2010/0031055 | A1* | 2/2010 | Furukawa | H04L 9/302 713/189 |

OTHER PUBLICATIONS

Dehbaoui et al., Electromagnetic Glitch on the AES Round Counter, Springer-Verlag, 2013.*
Gelin et al., Loop-Abort Faults on Supersingular Isogeny Cryptosystems, Springer, 2017.*
Proy et al., Compiler-Assisted Loop Hardening Against Fault Attacks, ACM, 2017.*
Yen et al., Checking Before Output May Not Be Enough Against Fault-Based Cryptanalysis, IEEE, 2000.*
Kiss et al., Algorithmic Countermeasures Against Fault Attacks and Power Analysis for RSA-CRT, 2016.*

(Continued)

*Primary Examiner* — Minh Dinh
(74) *Attorney, Agent, or Firm* — North Weber & Baugh LLP; Michael North

(57) ABSTRACT

Described herein are systems and methods that prevent against fault injection attacks. In various embodiments this is accomplished by taking advantage of the fact that an attacker cannot utilize a result that has been faulted to recover a secret. By using infective computation, an error is propagated in a loop such that the faulted value will provide to the attacker no useful information or information from which useful information may be extracted. Faults from a fault attack will be so large that a relatively large number of bits will change. As a result, practically no secret information can be extracted by restoring bits.

10 Claims, 4 Drawing Sheets

(56) References Cited

OTHER PUBLICATIONS

Search Report dated Jun. 19, 2019 in related French Patent Application No. FR1859337, (9 pgs).
Response to Search Report dated Nov. 1, 2019 in related French Patent Application No. FR1859337, (4 pgs).
Victor Lomne, "On the Need of Randomness in Fault Attack Countermeasures—Application to AES ", Workshop on Fault Diagnosis and Tolerance in Cryptography, Paris 2012 (10pgs).
John Borst, "Cryptograpy on smart cards", Computer Networks, COSIC Research Lab, Departement Electrical Engineering, 2001 Belgium (13 pgs).
Alessandro Barenghi, "Fault Injection Attacks on Cryptographic Devices: Theory, Practice, and Countermeasures", Proceedings Of The IEEE, vol. 100, Nov. 2012 (21 pgs).
Pablo Rauzy, "A Formal Proof of Countermeasures Against Fault Injection Attacks on CRT-RSA", Instilut Mines-Telecom, Telecom ParisTech ; CNRS LTCI, Jan. 30, 2014 (22 pgs).
Mehdi-Laurent Akkar, XP-008002641 "An Implementation of DES and AES, Secure against Some Attacks", Schlumberger CPS, 78431 Louveciennes, France, 2001 (10 pgs).
Notice of Allowance dated Feb. 11, 2022 in related French patent application No. FR1859337, (2 pgs).

\* cited by examiner

100

---
Algorithm 1 Genuine algorithm
---
Input: $a, b$
Output: $f(a, b)$
1:   $q \leftarrow init(a, b...)$
2:   for $i = n$ to $0$ do
3:       $q \leftarrow g_1(q, a, b)$
4:       if ... then
5:          $q \leftarrow g_2(q, a, b)$
6:       else
7:          $q \leftarrow g_3(q, a, b)$
8:       end if
9:   end for
10: return $(q)$
---

Algorithm 2 Modified algorithm
---
Input: $a, b$
Output: $f(a, b)$
1: $r \leftarrow random()$
2: $u \leftarrow r$
3: $q \leftarrow init(a, b, u...)$
4: for $i = n$ to $0$ do
5:     $u \leftarrow h_1(q, a, b, u)$
6:     $q \leftarrow g'_1(q, a, b, u)$
7:     if ... then
8:         $q \leftarrow g'_2(q, a, b, u)$
9:     else
10:         $q \leftarrow g'_3(q, a, b, u)$
11:     end if
12: end for
13: $q \leftarrow g'_4(q, a, b, u)$
14: if $h_2(r) = h_3(u)$ then
15:     return $(q)$
16: else
17:     return $(error)$
18: end if

FIGURE 3

FAULT ATTACK RESISTANT CRYPTOGRAPHIC SYSTEMS AND METHODS

CROSS-REFERENCE TO RELATED APPLICATION

This application claims the priority benefit of French Patent Application No. 1859337, filed Oct. 9, 2018, entitled "FAULT ATTACK RESISTANT CRYPTOGRAPHIC SYSTEMS AND METHODS," and listing as inventors Jeremy Dubeuf, Yann Yves Rene Loisel, and Frank Lhermet, which application is hereby incorporated by reference as to its entire content. Each reference mentioned in this patent document is incorporated by reference herein in its entirety.

A. Technical Field

The present disclosure relates generally to the field of secure systems and methods. More particularly, the present disclosure relates to secure systems and methods for protecting cryptographic systems against fault injection attacks employed to extract secret information by monitoring, probing, and manipulating electric circuitry that performs security-related operations.

B. Background

In cryptanalysis, a fault attack is a type of side-channel attack intended to exploit weaknesses in the implementation of a computer system to gain access to sensitive content. An active fault injection attack is a type of implementation attack that involves manipulating an otherwise secure system to leak exploitable information by injecting, during a cryptographic computation, a fault into computer system's implementation to force a faulted result that deviates from regular cryptographic operations such that the system's internal states may be revealed.

Fault analysis attacks are a common threat especially for embedded secure systems that use cryptographic algorithms such as RSA, ECC, etc., that heavily rely on loops. A sophisticated attacker may, thus, observe a regular system response during a cryptographic computation and then purposefully inject a fault into a device, such as a microcontroller, by manipulating an environmental condition of the device, e.g., to slightly manipulate the number steps for a loop iteration so as to cause a result that contains a computational error made by the cryptographic algorithm. The sophisticated attacker may then examine the effects of the fault on the device and its behavior, e.g., by comparing the differences in the faulted and regular results in order to deduce sufficient useful information to overcome the security of the algorithm and recover sensitive content, such as bits of a secret key. As a result, the system may fail a security certification due to non-compliance with heightened security standards.

One existing approach attempts to protect against fault attacks on a loop is by using two separate loop counters that control iterations of the loop by counting the number of iterations and evaluating both numbers at the end of the loop to determine whether a mismatch between the two counters has occurred. If so, the system interprets this result as a potential attack and may trigger an alarm, etc. However, in the case of a multi-fault attack, both counters may be faulted, such that, in the end, no fault handling code is executed and the multi-fault attack is not detected. Thus, such approaches do not ensure that computations have been performed inside the loop. In other words, such methods are incapable of correctly identifying a multi-fault attack.

Accordingly, to ensure proper compliance and thwart fault attacks, it would be desirable to have systems and methods available that protect against all types of fault attacks that are aimed at exposing the number of iterations when performing steps in a loop and other details during cryptographic computations to prevent that sensitive information is inadvertently revealed to potential attackers.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may be not to scale.

FIG. 1 shows an exemplary code fragment as is used in common algorithms that perform cryptographic computations.

FIG. 3 illustrates an exemplary software implementation of a process for protecting the number of iterations and content of a loop used in a cryptographic computation, according to various embodiments of the present invention disclosure.

DETAILED DESCRIPTION OF EMBODIMENTS

Figure 2:
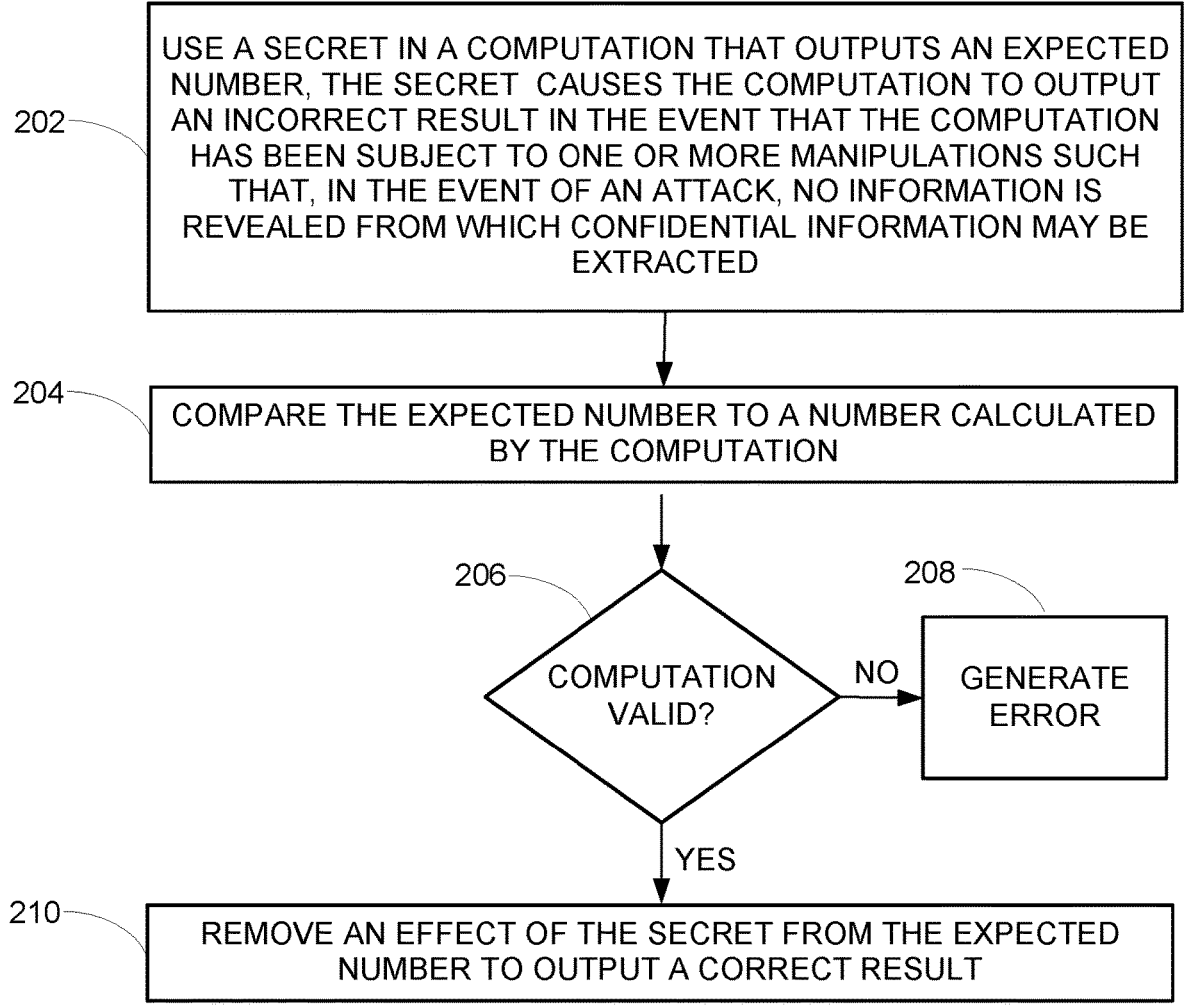
FIG. 2 is an exemplary flowchart that illustrates a process for protecting the number of iterations and content of a loop used in a cryptographic computation, according to various embodiments of the present invention disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion components may be described as separate functional units, which may comprise sub-units. Those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled"

shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Further, the use of memory, database, information base, data store, tables, hardware, and the like may be used herein to refer to system component or components into which information may be entered or otherwise recorded.

It shall also be noted that embodiments described herein are given in the context of computer algorithms that use programming language to execute steps, but one skilled in the art will recognize that the teachings of the present disclosure are not limited to software applications and may equally be implemented in hardware, e.g., using sate machines.

In this document the term "loop" refers to any type of control flow statement that defines a repetition or iteration, such as any type of for-loop or while-loop, including any type of compound loop.

The methods and systems presented herein address a number of security concerns in computing systems and provide system integrity not only for cryptographic computations and secure microcontrollers but also for a wide range of other hardware and software implementations that may benefit from the fault attack resistant infective countermeasures disclosed herein.

FIG. 1 shows an exemplary code fragment as is used in common algorithms that perform cryptographic computations of some kind. The structure shown in FIG. 1 may be used by a cryptographic algorithm, such as RSA or ECC, to perform loop iterations inside a loop to perform cryptographic computations. As a person of skill in the art will recognize, code fragment 100 is not necessarily specific to the domain of cryptographic computations. As depicted in FIG. 1 code fragment 100 contains, in line 1, an initialization step that initializes the variable q. Lines 2-9 are dedicated to a for-loop within which several computations are performed. A first computation, shown in line 3, involves a computation that is always performed by the loop. Lines 4-9 contain an if-else condition that performs functions based on certain parameters, and at the end of the for-loop, the result q is returned.

However, the loop iterations in algorithm 100 may be easily manipulated by a sophisticated attacker. For example, the attacker may employ a differential fault analysis attack to first obtain a regular (i.e., genuine) result q; and then the attacker may inject a fault into the microprocessor that executers algorithm 100, e.g., as part of a cryptographic algorithm. The attacker may do so, for example, by spiking the voltage of the microprocessor to cause the microprocessor to make an error during the execution of algorithm 100. Then the attacker may compare the difference between the regular and the faulted results and, based on this difference, the attacker may then obtain some useful information that aids in retrieving a secret or a partial secret, such as a private key.

In addition, the attacker may inject a fault during the computation of the loop such as to modify the number of iterations the for-loop is intended to undergo in order to cause the microcontroller to leak exploitable information. For example, for a loop iteration, the attacker may compute a result, manipulate the loop counter to count one less iteration than proscribed by algorithm 100, and then compute the same loop with the reduced number of iterations, i.e., reduced by one iteration. By comparing how the two scenarios affect the result of the algorithm, the attacker may then be able to deduce what occurred at the last step of the iteration, here, the if-step of the if-else condition. This information may then allow the attacker to obtain some useful information about a secret key, and the like. Therefore, it would be desirable to protect the number of iterations and contents of a loop used in a cryptographic computation that uses an algorithm such as algorithm 100 in FIG. 1.

Embodiments disclosed herein utilize an infective computation strategy that involves injecting into a computation a fault that propagates throughout the computation using the same path for correct and faulty executions to modify ciphertext in a manner such that the erroneous output provides no useful information to an attacker.

FIG. 2 is an exemplary flowchart that illustrates a process for protecting the number of iterations and content of a loop used in a cryptographic computation, according to various embodiments of the present invention disclosure. Process 200 begins at step 202 when a secret is used in a computation that outputs an expected number, the secret causes the computation to output an incorrect result in the event that the computation has been subject to one or more manipulations such that, in the event of an attack, no information is revealed from which confidential information may be extracted.

At step 204, the expected number is compared to a number that has been calculated by the computation.

Based on the result of the computation, at step 206, it is determined whether the computation is valid.

At step 208, in response to the computation being invalid, an error is generated. The error indicates that the computation has been subject to one or more manipulations.

At step 210, in response to the computation being valid, an effect of the secret is removed from the expected number, and a correct result is output.

It shall be noted for all embodiments disclosed herein (1) certain steps may optionally be performed; (2) steps may not be limited to the specific order set forth herein; (3) certain steps may be performed in different orders; and (4) certain steps may be performed concurrently.

FIG. 3 illustrates an exemplary software implementation of a process for protecting the number of iterations and content of a loop used in a cryptographic computation, according to various embodiments of the present invention disclosure. It is understood that process 300 in FIG. 3 is a code fragment that may be used in numerous types of cryptographic algorithms.

In embodiments, process 300 may be used to perform cryptographic computations in a cryptographic algorithm that performs loop iterations. In line 1, code fragment 300 comprises an initialization step that assigns a random number to a variable, r, to initialize an iterative loop.

In embodiments, the random number may be generated by using any type of random number generator known in the art. In embodiments, as shown in line 2, a value u may be derived from the variable r and used for computations inside the loop instead of using the variable r itself.

In line 3, variable q is initialized depending on the value u, such that lines 1-3 in FIG. 3 may be viewed as an initialization procedure that uses the random number.

Lines 4-12 define a for-loop, which performs several computations that comprise the random value u. It is understood that the functions in the for-loop, and thus u, evolve over time, i.e., u may be manipulated within the for-loop and may be different at each loop iteration.

It is understood that a function denoted with a prime (') in FIG. 3 may or may not be the same function as in FIG. 1. In embodiments, the use of a function denoted with a prime causes the expected result q to be modified by u. Similarly, function h1 may or may not modify variable u.

In embodiments, the variable u is used in all functions denoted with prime in order to provide the most number of infective computations and to detect errors in computations involving the variable u.

In embodiments, when a cryptographic function is computationally burdensome such that there is no easy way to insert the variable u into the function, u may be used in line 5 (and the comparison in line 14 to ensure, at the least, that the number of loop iterations is correct), but not in in lines 6, 8, and 10.

As depicted in FIG. 3, inside the for-loop, lines 5 and 6 may always be computed. As shown starting with line 5, in embodiments, the variable u may be used in all computations inside the for-loop, e.g., in functions h1 and g'1-g'3.

In embodiments, function g'2 comprises a construct that may be expressed as an addition, e.g., A+B, and g'3 is a construct that may be expressed as a subtraction, e.g., A-B, the final or correct q value, such the result will be altered in the same way.

Lines 7-11 comprise an if-else condition that performs functions based on certain parameters. At the end of the for-loop, the result q is evaluated.

At line 13, the correct q value, i.e., the expected result, may be recovered, e.g., by removing, if necessary, from the expected result q the random element, i.e., the u component, so as to avoid a faulty result. In embodiments, independent of the if-else condition in line 14, the same computation is performed with u. In other words, the variable u may modify q in the same way.

It is noted that if prime functions are not used or, as mentioned before, are the same as non-prime functions, it may not be necessary to remove the random element from q, because q will not be an element of u. As a result, for example, line 13 may not be used.

At line 14, once the u-component has been removed, the two functions $h2(r)$ and $h3(u)$ are compared to each other to determine whether they provide the same result. As mentioned, the expected u value may be computed from the r value, and a mismatch may be detected. If the number of computed iterations is incorrect, g'4 may not correctly remove u from q such that $h3(u)$ does not match $h2(r)$ and, thus, the error may be easily detected.

In embodiments, h2 and h3 depend on the types of computations that are performed on the u value during the iterations in the for-loop. In embodiments, given the r value, the new u value that should be obtained at the end of the for-loop may be computed. As a result, if $h2(r)$ and $h3(u)$ are different, this may indicate that the u value has not correctly evolved throughout the loop iteration. In other words, it may be detected whether the u value has been correctly computed by the loop iteration or u has evolved in some arithmetical way in the loop iteration that does not match an expected result. In effect, the comparison in line 14 may determine whether an expected number equals the calculated number to indicate whether the computations in the loop are valid.

In embodiments, if it is determined that the known secret u is incorrect (i.e., q in line 13 and computations in the loop are also incorrect), an error may be returned, as illustrated in line 17. If, for example, the number of loop iterations has been manipulated by an attacker, the expected value of the secret that undergoes cryptographic processing would also be incorrect, and may thus be detected.

Advantageously, the faulted results cannot be used by an attacker who seeks to recover secrets. In embodiments, this is due to the fact that the error propagates in the loop so much that the faulted value will not provide any useful information to the attacker and will also not provide any information from which useful information may be extracted, according to the principles of infective computation discussed above. As a result, due to infective computation, the faults would be so large that a relatively large number of bits changes, such that virtually no secret information may be extracted by restoring bits using a fault attack.

In embodiments, otherwise, if no error has been detected, such that the algorithm produces a correct result, the final q value is returned as valid in line 15.

In embodiments, due to infective computation, if the number of iterations has been manipulated, e.g., if a step has been skipped, the u value would not be the expected value and the result q would be incorrect due to the randomness of u. As a result, if the incorrect q is exposed to an attacker, the attacker would not be able to use this modified q value to recover any useful information.

In summary, prior to entering a loop, a secret and random value may be initialized and, inside the loop, the secret and random value may be processed using equations to evolve over time and modify intermediate results within the loop. At the end of the loop, the resulting values may be used to detect a possible unwanted alteration. An expected value may be corrected depending on the random value, and it may be verified whether the random value has properly evolved. In case of a fault, results would depend on the random number and, thus, a faulty result would not be usable by the attacker.

Advantageously, the cost of the additional computations to implement elements of the countermeasures, such as simple additions or subtractions, are much lower when compared to the elements of the rather complex and, thus, computationally burdensome cryptographic computations that involve loops, etc.

As a result, the overhead to obtain increased data integrity, security for loop iteration, and protected data flow is well constraint. In fact, experimental data has shown that, as applied to Elliptic Curve Cryptography, the expected overhead for the disclosed countermeasures is about 13% in time cost and less than 20% in memory usage cost (considering only working registers). It is noted that, in embodiments, the teachings of the present disclosure may be combined with any existing computation, e.g., such as that for an exist loop.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 4:
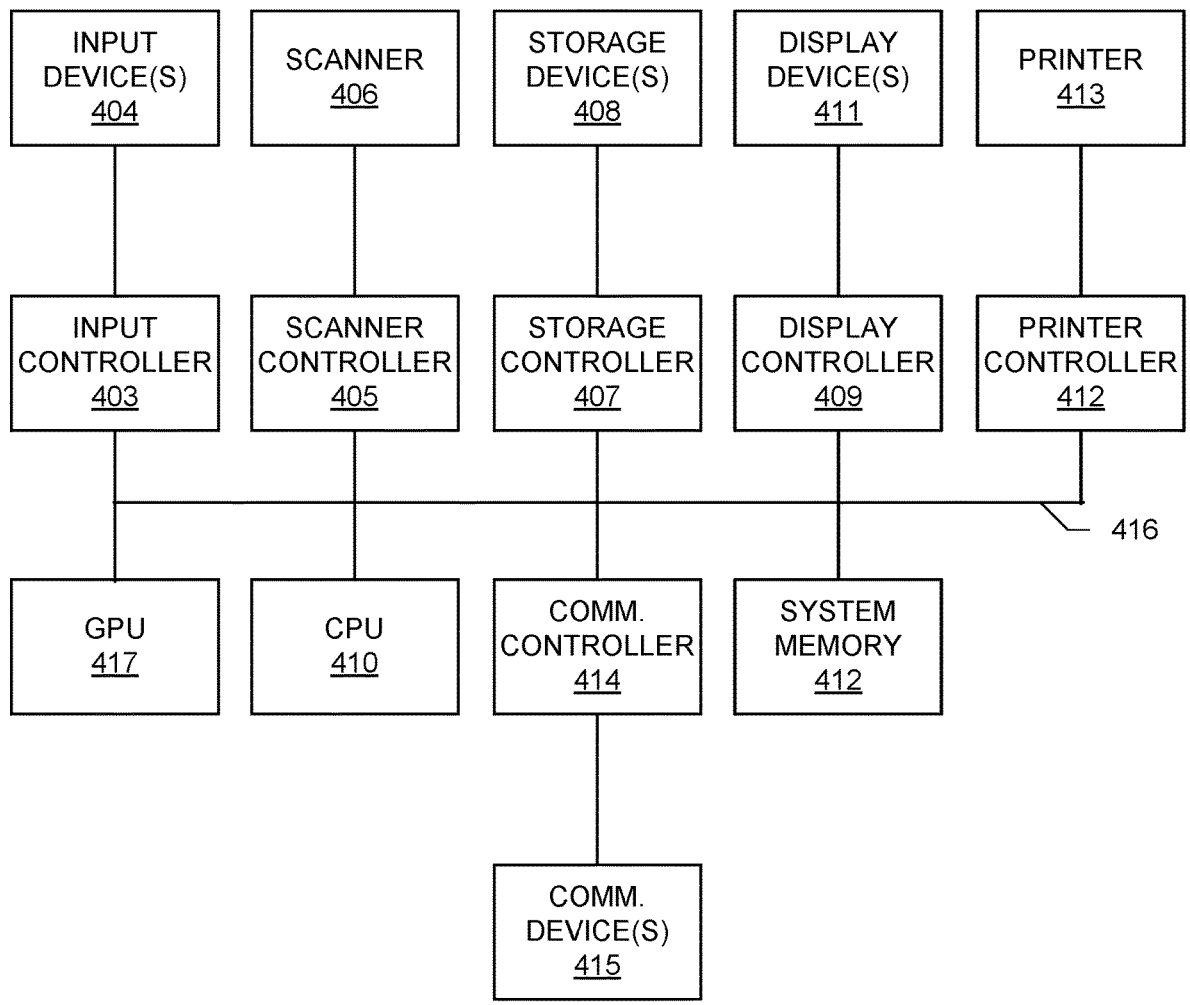
FIG. 4 depicts a simplified block diagram of a computing device/information handling system, in accordance with embodiments of the present disclosure.

FIG. 4 depicts a simplified block diagram of a computing device/information handling system (or computing system) according to embodiments of the present disclosure. It will be understood that the functionalities shown for system 400 may operate to support various embodiments of a computing system—although it shall be understood that a computing system may be differently configured and include different components, including having fewer or more components as depicted in FIG. 4.

As illustrated in FIG. 4, the computing system 400 includes one or more central processing units (CPU) 401 that provides computing resources and controls the computer. CPU 401 may be implemented with a microprocessor or the like, and may also include one or more graphics processing units (GPU) 419 and/or a floating-point coprocessor for mathematical computations. System 400 may also include a system memory 402, which may be in the form of random-access memory (RAM), read-only memory (ROM), or both.

A number of controllers and peripheral devices may also be provided, as shown in FIG. 4. An input controller 403 represents an interface to various input device(s) 404, such as a keyboard, mouse, touchscreen, and/or stylus. The computing system 400 may also include a storage controller 407 for interfacing with one or more storage devices 408 each of which includes a storage medium such as magnetic tape or disk, or an optical medium that might be used to record programs of instructions for operating systems, utilities, and applications, which may include embodiments of programs that implement various aspects of the present invention. Storage device(s) 408 may also be used to store processed data or data to be processed in accordance with the invention. The system 400 may also include a display controller 409 for providing an interface to a display device 411, which may be a cathode ray tube (CRT), a thin film transistor (TFT) display, organic light-emitting diode, electroluminescent panel, plasma panel, or other type of display. The computing system 400 may also include one or more peripheral controllers or interfaces 405 for one or more peripherals. Example of peripheral may include one or more printers, scanners, input devices, output devices, sensors, and the like. A communications controller 414 may interface with one or more communication devices 415, which enables the system 400 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 416, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An apparatus for carrying out computations, the apparatus comprising:
   a processor; and
   a non-transitory computer-readable medium coupled to the processor, the non-transitory computer-readable medium comprising instructions that, when executed by the processor, cause steps to be performed comprising:
   using a secret in a computation that outputs an expected number, the secret causes the computation to output an incorrect result in the event that the computation has been subject to one or more manipulations such that, in the event of an attack, no information is revealed from which confidential information may be extracted;
   comparing the expected number to a number calculated by the computation;
   based on the comparison, determining whether the computation is valid;
   in response to the computation being invalid, generating an error indicating that the computation has been subject to the one or more manipulations; and
   in response to the computation being valid, removing an effect of the secret from the expected number to output a correct result.

2. The apparatus according to claim 1, wherein the number calculated by the computation is calculated prior to calculating the expected number.

3. The apparatus according to claim 1, wherein the computation comprises an iteration of a loop.

4. The apparatus according to claim 3, wherein the one or more manipulations comprise reducing a number of iterations of the loop.

5. The apparatus according to claim 3, wherein the loop manipulates values related to the secret.

6. The apparatus according to claim 3, wherein the secret is derived from a random number generated by a random number generator.

7. The apparatus according to claim 6, wherein the random number is processed by one or more steps within the loop.

8. The apparatus according to claim 6, wherein the random number is injected at an initialization step outside of the loop.

9. The apparatus according to claim 6, wherein the random number is injected into an existing computation to facilitate infective computation.

10. The apparatus according to claim 9, wherein the infective computation causes the incorrect result to be greater than if the infective computation were not used.

* * * * *